May 19, 1970  E. H. DUDGEON  3,513,307
COPPER SMELTING CONVERTER HAVING AN INFRARED ANALYZER FOR
DETERMINING THE CONCENTRATION OF SULFUR DIOXIDE
IN THE FLUE GAS
Filed Nov. 14, 1966

United States Patent Office 3,513,307
Patented May 19, 1970

---

3,513,307
COPPER SMELTING CONVERTER HAVING AN INFRARED ANALYZER FOR DETERMINING THE CONCENTRATION OF SULFUR DIOXIDE IN THE FLUE GAS
Earl Howard Dudgeon, Ottawa, Ontario, Canada, assignor to Canadian Patents and Development Limited, Ottawa, Ontario, Canada, a Canadian corporation
Filed Nov. 14, 1966, Ser. No. 594,187
Claims priority, application Canada, Nov. 29, 1965, 946,504
Int. Cl. H01j 37/00
U.S. Cl. 250—43.5                                1 Claim

ABSTRACT OF THE DISCLOSURE

A copper smelting converter having means for sampling the flue gas discharged therefrom to determine the concentration of sulphur dioxide in the gases so as to control the timing of the final interruption of air blowing through the smelter. A probe projects into the path of travel of the flue gas and a means is provided for drawing a main flow of sample gas from the probe, dividing a subsidiary flow therefrom and passing it at a substantially constant pressure and temperature past an infra-red analyser to indicate the concentration of sulphur dioxide therein.

---

Figure 1:
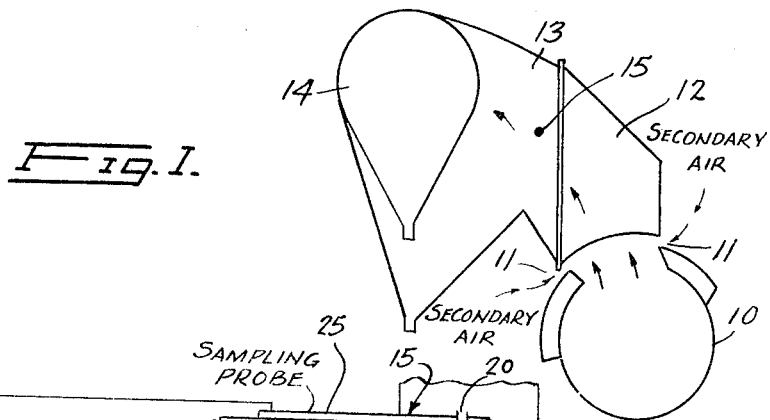

This invention relates to improvements in the carrying out of certain steps in the smelting of copper ore.

The standard process for smelting and refining copper, which has not changed substantially in over fifty years, comprises the following stages:

Firstly, copper ore concentrates and fluxes are melted together in a reverberatory furnace to form a slag containing iron and silicon oxides. This slag is skimmed off from the remainder of the melt, which remainder consists essentially of copper and iron sulphides, and is referred to as the matte.

In the second stage, this matte is treated in a converter to remove the iron and sulphur by oxidation and slagging to produce blister copper. Air is bubbled through the matte and the reaction is sufficiently exothermic that no external heating is required.

This second or "converter" stage is divided into two phases, the "slag" or "matte blow" phase and then the "copper blow" phase. During the "matte blow" phase a flux in the form of silica is added to produce the reactions $$2FeS + 3O_2 \rightarrow 2FeO + 2SO_2 + \text{heat}$$
$$xFeO + ySiO_2 \rightarrow x(FeO)y(SiO_2)$$

which latter substance takes the form of a slag that floats on top of the melt and is removed.

After all the iron sulphide has thus been used up, only copper sulphide (the so-called "white" metal) remains and the "copper blow" phase begins. The reactions are now:

$$2Cu_2S + 3O_2 \rightarrow 2Cu_2O + 2SO_2 + \text{heat}$$
$$Cu_2S + 2Cu_2O \rightarrow 6Cu + SO_2$$

It will be observed that during both phases sulphur dioxide is given off. This "copper blow" phase lasts typically for about two hours and it is very important to terminate the phase promptly, as soon as all the sulphur has been used up, because, if the blowing of air through the melt is allowed to continue, it results in significant amounts of copper being oxidized, according to the equation:

$$4Cu + O_2 \rightarrow 2Cu_2O$$

To stop the process (i.e. stop blowing air and pour the melt) at exactly the right time, known as the "copper end point" is very important. To blow air as little as 20 to 30 seconds too long can oxidize sufficient copper to cause substantial delays (e.g. an hour or more) in later stages of the process.

Such later stages comprise heating and treating the product of the converter (blister copper) in an anode furnace and finally electrolytic refining. These third and fourth stages will not be further discussed, since they are conventional, and since the present invention is concerned only with improvement in the conduct of the converter stage.

The conventional way of determining the copper end point is to rely on the judgment of an experienced converter operator who carefully watches various visual indications, such as flame colour, and takes small samples of the melt. The taking of these samples necessitates stopping the blowing process and tipping the converter. Thus, apart from the risk of an operator misjudging and over-shooting the end point, there is a delay involved in stopping the process temporarily, every time samples are needed.

It is towards the overcoming of these disadvantages that the present invention is directed, the object of the invention being to provide apparatus and method for determining the end point automatically, accurately and reliably, without the need to halt the process for sample taking. Not only can the time in the converter thus be kept as short as possible, but also the subsequent time in the anode furnace is minimised, because oxidation in the converter can be kept down to a small amount.

To this end the invention provides apparatus and method for continuously sensing the percentage concentration of sulphur dioxide in the gas issuing from the converter. It has been found that this percentage falls sharply during the last five to ten minutes, and continues to fall until the end point is reached. For example, a typical sulphur dioxide percentage during the "copper blow" phase will be of the order of 10 to 20%. This percentage will vary with the location at which gas samples are taken. It will be highest in the upper part of the converter itself, but practical considerations (the very high temperatures and the mechanical complications attendant upon the need to tip the converter to pour) render this a less desirable location for sampling. In the flue, where sampling is easier from the standpoint of such mechanical considerations, the gas has already been diluted with secondary air which enters the flue hood around the edges of the converter, and, as a result, the sulphur dioxide content in the flue is rather less than in the converter. At all locations the $SO_2$ content tends to rise gradually during progress of the blow, e.g. from typically about 5% to about 15% in the flue. It has been found, however, that almost regardless of where the samples are taken, the $SO_2$ content exhibits a sharp drop as the end point is approached. For example, taking the flue location again as an example of the sampling location it has been observed that the $SO_2$ content starts to drop about 10 minutes before the end point and continues a steady decline until, at the end point itself, it is typically of the order of 0.5%.

The method of the present invention has the further feature that, if desired, the copper blow can be stopped a predetermined interval in advance of the actual end point. It has been found, for example, that to end the blow a little early is preferable to ending it even a few seconds too late. The reason for this is believed to reside in the fact that, during the last few minutes before the end point, as demonstrated by a very low sulphur dioxide level, is reached, the sulphur dioxide contained in the flue gas is not so much the result of continued reaction of remaining copper sulphide with the blowing air, as the flushing out of already formed but hitherto entrained sulphur dioxide. Such entrained sulphur dioxide, even if it were allowed to remain entrained in the copper after solidification, is not harmful to the efficiency of the subsequent anode furnace operation, the way one of the compounds copper sulphide or copper oxide would be. Another way of expressing this concept is to say that the true end point, i.e. the theoretical moment when all the copper sulphide has just been eliminated and before any appreciable amount of copper oxide has begun to form, takes place a short while in advance of the appearance of the manifestations of the end point which are the only indications normally available to the operator for making a skilled estimate of that moment. By monitoring the sulphur dioxide content of the flue gas a continuous record is available of a significant indicator of conditions in the converter. It is no longer necessary to wait for the conventionally observed visual indications of end point. Instead, the blowing process can be halted at any point on the downward curve of sulphur dioxide content during the last minutes of blowing. As necessary, the exact determination of the optimum position on that curve, at which it is best to stop the process, can be arrived at by trial for any given converter, and from then on the same conditions can be repeated in each subsequent "copper blow" with a reliability that is independent of the judgment of a human operator.

In addition to the all-important matter of determining the moment to halt blowing at the end of a copper blow in the converter stage, the provision of means for monitoring the sulphur dioxide content of the flue gas will provide the operator during the earlier part of such copper blow with information about converter conditions that may prove valuable to him in the determination of other operating conditions, such as the best times and amounts for the adding of additional cold copper matte.

Figure 2:
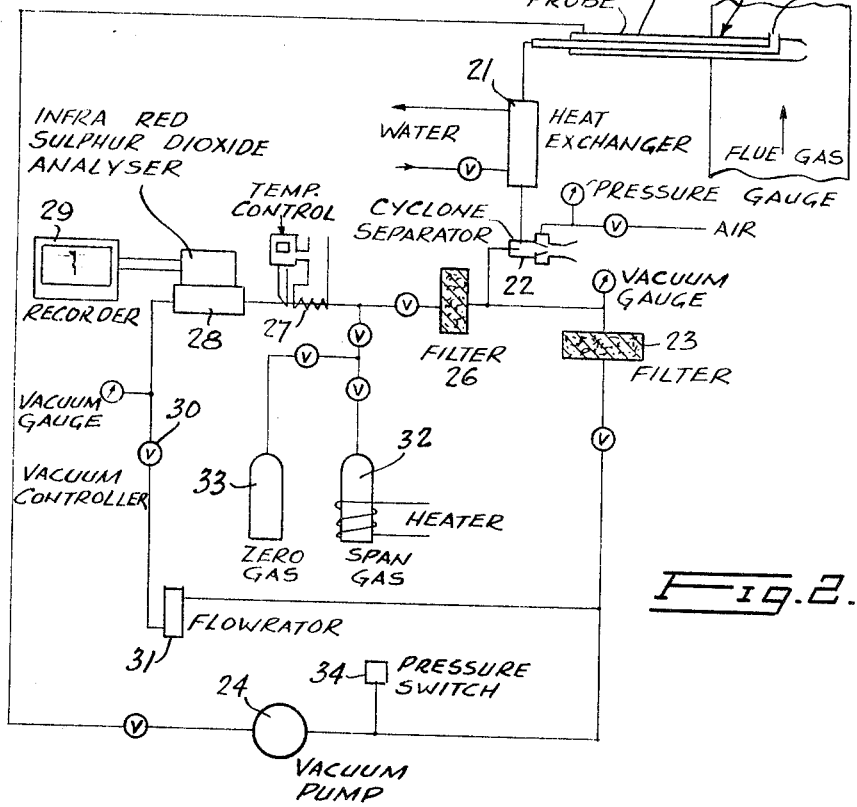
Figure 3:
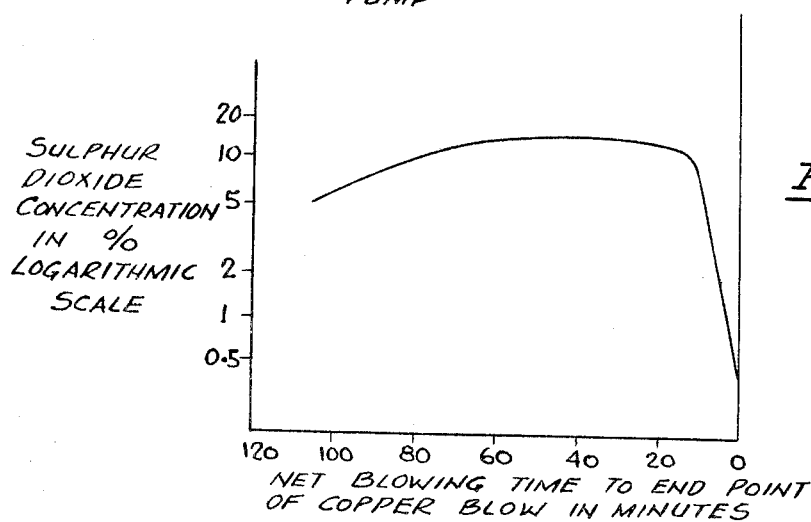

The practical detection of the sulphur dioxide content can be carried out by any one of the various instruments commercially available for this purpose, provided such instrument has a reasonably rapid response. As indicated above, an error of 20 to 30 seconds can be critical. For this reason an instrument with only a few seconds response time is preferred; it is also desirable to have a probe and sampling system for conveying the flue gas to the instrument with as short a delay as possible. Such an arrangement is illustrated diagrammatically and by way of example only in the accompanying drawings, in which:

FIG. 1 shows the converter and flue arrangement;
FIG. 2 shows the sampling system; and
FIG. 3 shows a typical curve of $SO_2$ content of the flue gas.

The converter is shown at 10. Secondary air can enter at 11 and the flue gas, comprising the air being blown through the converter mixed with the secondary air, enters a hood 12 and then passes through duct 13 to a flue 14 and finally to a smoke stack (not shown). Balancing the desirability of sampling the flue gas reasonably near to the converter, against the mechanical complications of mounting a sampling probe either in the mouth of the converter itself or in the hood which has to be removed for cleaning, leads to a satisfactory compromise in locating the probe 15 in the duct 13 near the hood 12. The location of the probe 15 is mainly a matter of convenience, because the system is concerned essentially with the comparison of relative values from time to time. Once the probe has been placed in a selected location, reliable comparisons can be made, and it has been found that the curves of $SO_2$ content are generally the same shape, if not the same magnitude, for different probe locations. FIG. 3 shows a typical curve (with minor short term variations smoothed out) for the sulphur dioxide concentration at the location of the probe 15 plotted against time. It will be quite evident how sharply the $SO_2$ content declines over the last ten minutes, and equally evident how the operator can select the level of $SO_2$ concentration at which he finds it best to stop the blow, and how he can reproduce the same conditions with subsequent batches.

To maintain a substantial rate of flow to prevent the apparatus responding sluggishly, the flue gas from the probe intake orifice 20, which faces downstream to minimise the intake of entrained dust, is pumped around a main circuit comprising a heat exchanger 21, cyclone separator 22, filter 23, and vacuum pump 24 back to an outer jacket 25 surrounding the probe inlet tube, to cool incoming gas. If found unnecessary such cooling jacket 25 can be dispensed with and the return gas simply vented into the flue. The gas is cooled to room temperature in the heat exchanger 21 and a by-pass circuit of such cooled gas passes through a filter 26 and a thermostatically controlled heater 27 which ensures that the gas sample is received at a constant temperature by an infra red sulphur dioxide concentration analyser 28 which operates a recorder 29. Since it is important for the accuracy of the analyser readings that this instrument operate at a steady pressure, a vacuum controller 30 is provided, which consists of a perforated plate and ball valve that automatically regulate the pressure at the instrument 28. A flowrator 31 provides a visual indication of the rate of flow through the analyser 28 which rate must be maintained within certain limits if the readings of the analyser instrument are not to become unreliable.

The analyser is calibrated by means of a prepared mixture of gas 32, i.e. 20% sulphur dioxide in air and a zero gas 33, i.e. 0% sulphur dioxide or mixtures thereof provided by mixing.

The system is completed by various valves and gauges, the functions of which will obvious, and a pressure switch 34 which provides an alarm in the event of an undue pressure drop on the suction side of the pump 24, which occurrence would be indicative of a clogged filter or other impedance to proper gas flow.

In practice it will normally be sufficient merely to record the $SO_2$ concentration on the recorder 29, to observe the same, and then stop the blowing operation manually when a selected concentration has been reached. Alternatively, if desired, this operation can be made automatic by connecting a suitable switching circuit to the recorder and arranging for this circuit to terminate the converter operation.

I claim:
1. The combination of a copper smelting converter, means for continuously sampling flue gas from said converter, and means for continuously sensing the concentration of sulphur dioxide in said sampled gas; wherein said means for sampling the flue gas comprise a probe projecting into the path of travel of flue gas issuing from said converter, means for drawing a main flow of sample gas from said probe, means for dividing said main flow to derive a subsidiary flow therefrom, said subsidiary flow being substantially smaller than said main flow, and control means for passing said subsidiary flow to said sensing means at a controlled flow rate, at a substantially constant pressure and at a substantially constant temperature; and wherein said sensing means comprise an infra-red analyser for receiving said subsidiary gas flow and an indicator connected to said analyser to indicate the readings thereof and hence the concentration of sulphur dioxide in said subsidiary gas flow.

References Cited
UNITED STATES PATENTS 2,269,674   1/1942   Liddel et al.   250—43.5
2,462,995   3/1949   Ritzmann   250—43.5

RALPH G. NILSON, Primary Examiner
A. L. BIRCH, Assistant Examiner

U.S. Cl. X.R.
75—75